(12) United States Patent
Russell et al.

(10) Patent No.: US 11,240,856 B2
(45) Date of Patent: *Feb. 1, 2022

(54) ACCESS POINT NAME DETERMINATION FOR MISSION CRITICAL SERVICES

(71) Applicant: BlackBerry Limited, Waterloo (CA)

(72) Inventors: Nicholas James Russell, Newbury (GB); David Philip Hole, Southampton (GB); Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 43 days.

This patent is subject to a terminal disclaimer.

(21) Appl. No.: 16/905,633

(22) Filed: Jun. 18, 2020

(65) Prior Publication Data

US 2020/0323000 A1 Oct. 8, 2020

Related U.S. Application Data

(63) Continuation of application No. 16/070,718, filed as application No. PCT/US2017/014323 on Jan. 20, 2017, now Pat. No. 10,716,152.
(Continued)

(51) Int. Cl.
*H04W 76/11* (2018.01)
*H04W 76/12* (2018.01)
(Continued)

(52) U.S. Cl.
CPC ......... *H04W 76/11* (2018.02); *H04L 63/0892* (2013.01); *H04L 65/1016* (2013.01);
(Continued)

(58) Field of Classification Search
CPC ....... H04W 76/11; H04W 4/90; H04W 76/50; H04W 36/0022; H04W 76/12; H04W 84/042; H04L 63/0892; H04L 65/1016
See application file for complete search history.

(56) References Cited

U.S. PATENT DOCUMENTS 9,426,637 B2 8/2016 Lim et al.
9,825,951 B2 * 11/2017 Zhang ............... H04W 28/0289
(Continued)

FOREIGN PATENT DOCUMENTS

EP 2757843 7/2014
WO 2009/097818 8/2009
(Continued)

OTHER PUBLICATIONS

3rd Generation Partnership Project 23.179 V2.0.0; Technical Specification Group Services and System Aspects; Functional architecture and information flows to support mission critical communication services; Stage 2 (Release 13), Dec. 3, 2015, 234 pages.
(Continued)

*Primary Examiner* — Tejis Daya
(74) *Attorney, Agent, or Firm* — Fish & Richardson P.C.

(57) ABSTRACT

A method for determining an access point name (APN) for mission critical services includes determining, at a user equipment (UE), APN information of a packet data network (PDN) based on at least one of a mission critical organization name, a registered public land mobile network identifier, or a home public land mobile network identifier currently associated with the UE; and connecting to the PDN based on the determined APN information.

10 Claims, 12 Drawing Sheets

Related U.S. Application Data

(60) Provisional application No. 62/286,178, filed on Jan. 22, 2016.

(51) Int. Cl.
  *H04W 4/90* (2018.01)
  *H04W 76/50* (2018.01)
  *H04L 29/06* (2006.01)
  *H04W 36/00* (2009.01)
  *H04W 84/04* (2009.01)

(52) U.S. Cl.
  CPC ......... *H04W 4/90* (2018.02); *H04W 36/0022* (2013.01); *H04W 76/12* (2018.02); *H04W 76/50* (2018.02); *H04W 84/042* (2013.01)

(56) References Cited

U.S. PATENT DOCUMENTS

| | | | |
|---|---|---|---|
| 10,716,152 | B2 | 7/2020 | Russell et al. |
| 2004/0228347 | A1 | 11/2004 | Hurtta et al. |
| 2009/0191841 | A1 | 7/2009 | Edge et al. |
| 2010/0255808 | A1 | 10/2010 | Guo et al. |
| 2011/0026463 | A1 | 2/2011 | Lair |
| 2011/0189971 | A1 | 8/2011 | Faccin et al. |
| 2013/0286828 | A1 | 10/2013 | Cho et al. |
| 2014/0153402 | A1 | 6/2014 | Rubin et al. |
| 2015/0281935 | A1 | 10/2015 | Suh et al. |
| 2016/0295386 | A1 | 10/2016 | Faccin et al. |
| 2017/0288886 | A1* | 10/2017 | Atarius ............... H04L 65/1063 |
| 2017/0310761 | A1 | 10/2017 | Enomoto et al. |
| 2017/0367016 | A1* | 12/2017 | Taneja ............... H04W 36/0044 |
| 2017/0374109 | A1 | 12/2017 | Atarius et al. |
| 2018/0041857 | A1 | 2/2018 | Ouchi et al. |
| 2018/0270891 | A1 | 9/2018 | Kim et al. |
| 2019/0029058 | A1 | 1/2019 | Russell et al. |
| 2019/0110238 | A1* | 4/2019 | Buckley ............... H04W 88/04 |

FOREIGN PATENT DOCUMENTS

| | | |
|---|---|---|
| WO | 2011/024030 | 3/2011 |
| WO | 2014/166884 | 10/2014 |
| WO | 2016/006948 | 1/2016 |

OTHER PUBLICATIONS

Extended European Search Report issued in European Application No. 17742006.4 dated Sep. 12, 2019, 8 pages.

PCT International Search Report and Written Opinion in International Application No. PCT/US2017/014,323, dated May 3, 2017, 12 pages.

Liebhart et al., "LTE for Public Safety" In: LTE for Public Safety, Jul. 31, 2015, 227 pages.

Non-Final office action issued in U.S. Appl. No. 16/070,718 dated Nov. 7, 2019, 23 pages.

Notice of Allowance issued in U.S. Appl. No. 16/070,718 dated Feb. 28, 2020, 9 pages.

Office Action issued in European Application No. 17742006.4 dated Oct. 1, 2019, 1 page.

* cited by examiner

800

6.5A   Authentication for MCPTT access
6.5A.1  UE Procedures 3-4) If:
  a) the UE supports the "Configuration request";
  b) the EAP-Request/AKA'-Challenge message includes the AT_APN_REQUEST_SUPPORTED attribute as described in subclause 8.2.X.1 wherein the message field as described in subclause 8.1.4.1:
    1) contains the message type field indicating APN_REQUEST_SUPPORTED; and
    2) contains the type field including the APN Request Supported field item as described in subclause 8.2.X.1 indicating APN Supported; and
  c) the UE requests usage of the "APN";
5-6) then the UE:
  a) shall include the AT_APN_REQUEST attribute according to subclause 8.2.X.2 in the EAP-Response/AKA'-Challenge message. In the message field according to subclause 8.1.4.1 of the AT_APN_REQUEST attribute, the UE shall:
    1) set the message type field to APN_REQUEST; and
    2) contains the type field including the APN Request field item as described in subclause 8.2.X.2 indicating APN for MCPTT requested; and
7-8) Upon receiving the EAP-Request/AKA'-Notification message including the
AT_APN_RESP attribute as described in subclause 8.2.X.3 where the message field as described
in subclause 8.1.4.1:
  - contains the message type field indicating APN_RESP; and
  - contains the field APN Encoded;
the UE:
  - store the APN to be used to create the bearer to be used for IMS signaling for MCPTT service.
6.5A.2  AAA Procedures The 3GPP AAA server may support MCPTT APN configuration.

3-4) If the network supports MCPTT APN configuration, the 3GPP AAA server shall include
  a) in the EAP-Request/AKA'-Challenge message includes the AT_APN_REQUEST_SUPPORTED attribute as described in subclause 8.2.X.1 wherein the message field as described in subclause 8.1.4.1:
    1) contains the message type field indicating APN_REQUEST_SUPPORTED; and
    2) contains the type field including the APN Request Supported field item as described in subclause 8.2.X.1 indicating APN Supported; and
5-6) If the 3GPP AAA server supports MCPTT APN configuration; and the AAA server receives
the AT_APN_REQUEST attribute according to subclause 8.2.X.2 in the EAP-Response/AKA'-Challenge message.
In the message field according to subclause 8.1.4.1 of the AT_APN_REQUEST attribute, the following are:
    1) set the message type field to APN_REQUEST; and
    2) contains the type field including the APN Request field item as described in subclause 8.2.X.2 indicating APN for MCPTT requested; and
    Then the AAA server optionally contacts an external database (e.g. identity management

FROM FIG. 8A server, configuration management server) to obtain an APN to be used for the Mission Critical User identity provided EAP-RSP/AKA'-identity message. The Mission Critical User identity may be sent to the external database. The AAA server receives back an APN to be used for MCPTT services.
7-8) The AAA sends the EAP-Request/AKA'-Notification message including the AT_APN_RESP attribute as described in subclause 8.2.X.3 where the message field as described in subclause 8.1.4.1:
- contains the message type field indicating APN_RESP; and
- contains the field APN Encoded;

8.1.4.1 Message
The message is coded according to figure 8.1.4.1-1 and table 8.1.4.1-1.

Table 8.1.4.1-2: Message type

```
The value is coded as follows.
7  6  5  4  3  2  1  0
0  0  0  0  0  0  0  1    CONNECTION_CAPABILITY
0  0  0  0  0  0  1  0    SCM_REQUEST
0  0  0  0  0  0  1  1    SCM_RESPONSE
0  0  0  0  0  1  0  0    MCM_REQUEST
0  0  0  0  0  1  0  1    MCM_RESPONSE
0  0  0  0  0  1  1  1    APN_REQUEST_SUPPORTED
0  0  0  0  1  0  0  0    APN_REQUEST
```

8.2.X Identity attributes
8.2.X.1 AT_APN_Request Supported attribute

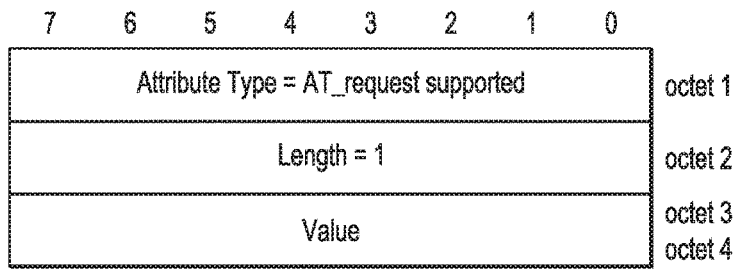

Figure 8.2.X.1-1: AT_APN_Request Supported attribute

Table 8.2.X.1-1: : AT_APN_Request Supported

Octet 1 indicates the type of attribute as AT_APN_Request Supported with a value of 1XX.
Octet 2 is the length of this attribute which shall be set to 1 as per IETF RFC 4187 [33]
Octet 3 and 4 is the value of the attribute. Octet 3 is reserved and shall be coded as zero. Octet 4

FROM FIG. 8B

```
shall be set as follows. All other values are reserved.
7 6 5 4 3 2 1 0    APN Request Supported field
0 0 0 0 0 0 0 1    APN Request Supported
0 0 0 0 0 0 1 0    APN Request not supported
1 1 1 1 1 1 1 1    Reserved
```

8.2.X.2  AT_APN_Request attribute

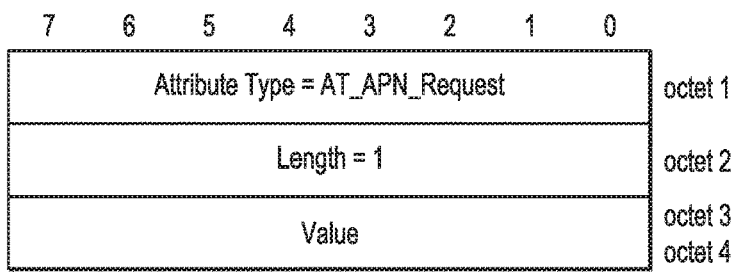

Figure 8.2.X.2-1: AT_APN_Request attribute

Table 8.2.X.2-1: : AT_APN_Request attribute

| Octet 1 indicates the type of attribute as AT_APN_Request with a value of 1XX. |
| --- |
| Octet 2 is the length of this attribute which shall be set to 1 as per IETF RFC 4187 [33] |
| Octet 3 and 4 is the value of the attribute. Octet 3 is reserved and shall be coded as zero. Octet 4 shall be set as follows. All other values are reserved.<br><br>7 6 5 4 3 2 1 0    APN Request field<br>0 0 0 0 0 0 0 1    APN for MCPTT requested<br>0 0 0 0 0 0 1 0    Reserved to<br>1 1 1 1 1 1 1 1    Reserved |

8.2.X.3  AT_APN_RESP attribute

8.2.X.3.1  General

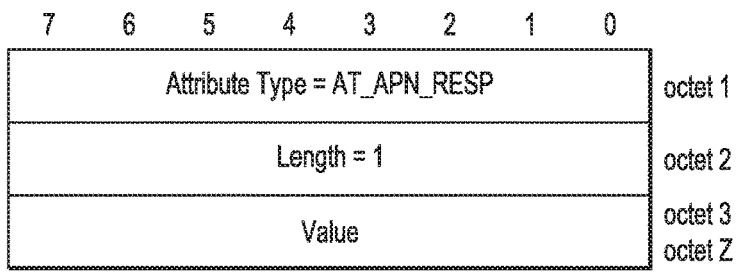

Figure 8.2.X.3-1: AT_APN_RESP attribute

FIG. 8D FROM FIG. 8C

8.2.x.3.2 Value
There may be multiple Values encoded in the AT_APN_RESP_attribute

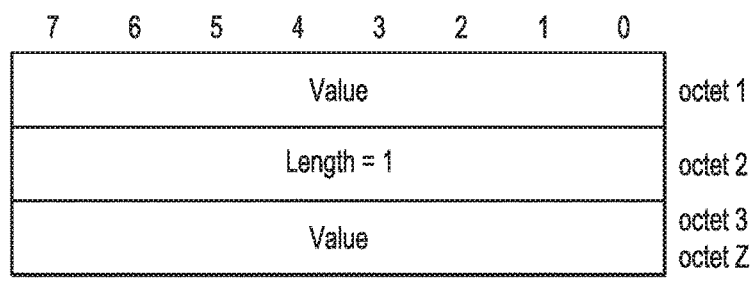

Figure 8.2.X.3-1: AT_APN_RESP attribute Value

Table 8.2.X.3-1: : AT_APN_RESP attribute Value

| Octet 1 indicates the identity that is encoded. |
|---|
| Octet 1 shall be set as follows. All other values are reserved. |
| 7 6 5 4 3 2 1 0     APN Encoded |
| 0 0 0 0 0 0 0 1     APN Encoded |
| 0 0 0 0 0 0 1 0     Reserved to |
| 0 0 0 0 0 0 1 1     Reserved |

8.2.x.3.3 APN
The APN field is an octet string encoded according to UTF-8 encoding rules and contains an APN as described in 3GPP TS 23.003 [3].

ACCESS POINT NAME DETERMINATION FOR MISSION CRITICAL SERVICES

CLAIM OF PRIORITY

This application claims priority to U.S. patent application Ser. No. 16/070,718 filed Jul. 17, 2018, which is a National Stage Entry of PCT/US2017/014323 filed Jan. 20, 2017, which claims priority to U.S. Provisional Application No. 62/286,178 filed on Jan. 22, 2016, the entire contents of which are hereby incorporated by reference.

TECHNICAL FIELD

This disclosure relates to data transmission in wireless communication systems and, more specifically, to access point name (APN) determination for mission critical (MC) services.

BACKGROUND

Mission critical (MC) (also sometimes referred to as public safety) services are services that are provided to users of MC organizations. Examples of MC organizations may include a police department, an ambulance service, or a fire service. An example of an MC service is MC Push-To-Talk (MCPTT), which is an MC service that provides a "walkie-talkie" like service to users of MC organizations. Other MC services besides voice or audio can include MC video and MC data. Users of MC organizations are referred to as MC users. An identity (e.g. name) of a user's MC organization can be configured in a user equipment (UE) of the user. A user connects to packet data networks (PDNs) to access MC services or perform MC user authentication. Different MC organizations may be associated with different PDNs. Each PDN is identified by an access point name (APN). An APN has to be determined for the UE to access MC services or perform MC user authentication.

DESCRIPTION OF DRAWINGS

FIGS. 8A-8D illustrates an example description to obtain APN information for MC services during an MC user authentication according to an implementation.

Like reference numbers and designations in the various drawings indicate like elements.

DETAILED DESCRIPTION

The present disclosure is directed to access point name (APN) determination for mission critical (MC) services. In some cases, MC services are provided to MC users of an MC organization by an MC Service Provider. The MC Service Provider may be a public land mobile network (PLMN) operator or may be a completely separate entity. In the latter case, the MC Service Provider may have a business relationship with multiple PLMN operators to provide mobile/cellular service (known as Home PLMNs). Home PLMNs (HPLMNs) may have arrangements (also known as "roaming agreements") with other PLMN operators to utilize the other PLMN operators' networks. These other PLMN operators may be referred to as Visited PLMNs (VPLMNs), and UEs may roam onto VPLMNs e.g. when there is no mobile/cellular radio coverage of the HPLMN at the UE's location. A UE's registered PLMN (RPLMN) is called RPLMN and a UE may register to its HPLMN or a VPLMN. Therefore, the RPLMN could be either a network belonging to the UE's HPLMN or a network belonging to a VPLMN.

When a UE requests MC services, depending on the UE's MC organization and one or both of the UE's HPLMN and RPLMN, different packet data networks (PDNs) may be used to provide MC services. For example, if the UE's RPLMN has changed due to roaming, the UE may connect to a different PDN for the same MC services. Also, when a UE performs MC user authentication, depending on the UE's MC organization and one or both of the UE's HPLMN and RPLMN, different PDNs may be used to provide the MC user authentication. Therefore, the UE has to know what APN to use in order to connect to a PDN to receive the MC services, perform the MC user authentication, etc. The present subject matter determines APN information of a PDN based on, for example, the UE's MC organization and the UE's PLMN information.

Figure 1:
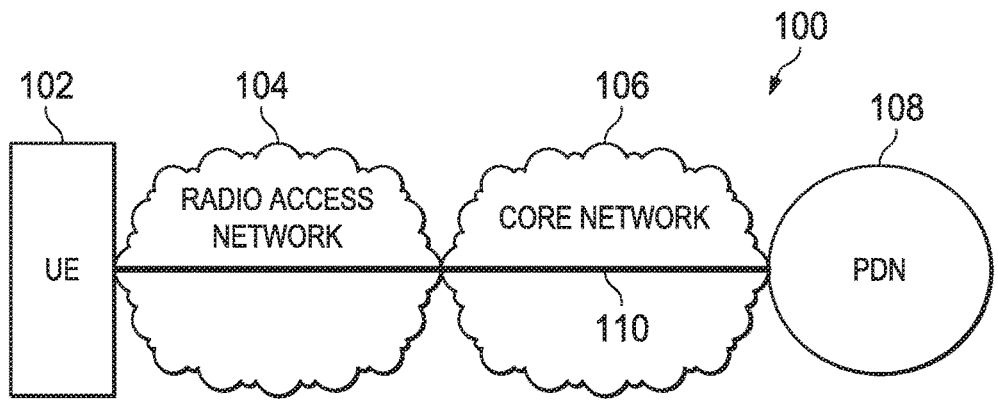
FIG. 1 is an example wireless communication system that provides data connectivity for services according to an implementation.

FIG. 1 shows an example wireless communication system 100 that provides data connectivity for services according to an implementation. In some implementations, a UE determines APN information of a PDN based on at least one of an MC organization name, a registered public land mobile network (RPLMN) identifier, or an HPLMN identifier currently associated with the UE. The UE can connect to the PDN based on the determined APN information. The UE can also determine the APN information based on an MC service provider identity. The UE can determine the MC organization name, the RPLMN identifier, and the HPLMN identifier currently associated with the UE. The PDN can be used for at least one of MC services or MC user authentication. The APN information may include an APN network identity (NI). In some cases, the APN information can be further determined by a Mobility Management Entity (MME) based on at least one of the MC organization name, the RPLMN identifier, or the HPLMN identifier.

In some implementations, determining APN information based on at least one of an MC organization name, an RPLMN identifier, or an HPLMN identifier currently associated with the UE includes creating a string of characters including at least one of the MC organization name, the RPLMN identifier, or the HPLMN identifier. The UE can determine inclusion or exclusion of the MC organization name, the RPLMN identifier, or the HPLMN identifier in the string of characters based on a configuration in or available to the UE. The UE can create the string of characters for APN information when there is no configured APN information stored at the UE.

In some implementation, determining APN information based on at least one of an MC organization name, an RPLMN identifier, or an HPLMN identifier currently associated with the UE includes storing at the UE configured APN information for at least one MC organization name and public land mobile network (PLMN) identifiers associated with each of the at least one MC organization name. The UE identifies a match between the MC organization name and the PLMN identifier currently associated with the UE and an MC organization name and a PLMN identifier in the configured APN information. In response to identifying the match, the UE retrieves the configured APN information for the MC organization name and the PLMN identifier. The UE can also compare the RPLMN identifier currently associated with the UE to a VPLMN identifier in the configured APN information. In response to the RPLMN identifier matching the VPLMN identifier, the UE retrieves the configured APN information for the VPLMN identifier. In response to the RPLMN identifier not matching the VPLMN identifier, the UE compares the HPLMN identifier currently associated with the UE to an HPLMN identifier in the configured APN information. If the HPLMN identifier currently associated with the UE matches an HPLMN identifier in the configured APN information, the UE retrieves the configured APN information for the HPLMN identifier. The configured APN information can be stored in a management object. In some cases, the UE includes an MC client and a configuration management client.

In some implementations, a UE sends a first message to a first network node, the first message including at least one MC user identity associated with the UE. The UE receives from the first network node a second message indicating that the UE can request APN information of a PDN for MC services. The UE sends a third message to a second network node, the third message requesting the APN information. The UE receives from the second network node a fourth message including the APN information. The UE can connect to the PDN based on the received APN information. In some cases, the first network node and the second network node are an identity management server. The first, second, third and fourth messages are sent or received via an identity management client in the UE, and the first, second, third and fourth messages are authentication messages. In some cases, the first network node is an identity management server, and the second network node is a configuration management server. The first and second messages are authentication messages, the first and second messages are sent or received via an identity management client in the UE, and the third and fourth messages are sent or received via a configuration management client in the UE. The APN information can include an APN NI of the PDN.

In some implementations, the UE stores APN information configured for an MC organization (where the MC organization may be identified via an MC organization name or some other identifier) and PLMN identifiers associated with the MC organization. The UE may determine a current MC organization (e.g. via a configured current MC organization name) and a current PLMN identifier associated with the UE (e.g. RPLMN, HPLMN). The UE may identify a match between the current MC organization name and a stored MC organization name, as well as a match between the current PLMN identifier and stored PLMN identifiers (e.g. VPLMN, HPLMN) associated with the matched MC organization name. In response to identifying the matches, the UE may retrieve corresponding APN information (and optionally other information) configured for the current organization name and the current PLMN identifier associated with the UE. In some cases, the UE may compare a current RPLMN identifier associated with the UE to a VPLMN identifier associated with the stored APN information. In response to a non-match from the comparison, the UE may compare a current HPLMN identifier associated with the UE to an HPLMN identifier associated with the stored APN information. In some cases, the configured APN information may be stored in a management object (MO). The APN information may include an APN NI or both an APN NI and an APN OI of a PDN. The PDN may be used for at least one of MC services or an MC user authentication. In some cases, the UE includes an MC client.

In some implementations, the UE may receive, from a first network node, a first message indicating that the UE can request APN information of a PDN. In response to the first message, the UE may send, to the first network node or a second network node, a second message requesting the APN information. In response to the second message, the UE may receive, from the first network node or second network node, a third message including the APN information. In some cases, at least one of the first, second, or third message is an authentication message. In some cases, the APN information includes an APN NI or both an APN NI and an APN OI of the PDN, and the PDN is used for at least one of MC services or MC user authentication.

The APN determination for MC services according to methods and systems described herein can autonomously/ automatically determine the APN information based on the current MC Organization and/or the PLMNs to which the UE is currently associated. For example, if the UE's RPLMN has changed due to roaming and a new PDN has to be used, the UE by itself may determine the APN of the new PDN without asking for additional information from the network. Additionally, the methods and systems described herein enable a flexible network arrangement. For example, instead of having different MC service providers hosted on an HPLMN to use a same PDN, the described approaches enable different MC services, MC Organizations, and/or PLMNs to use different PDNs.

At a higher level, the example wireless communication system 100 includes a UE 102 and a PDN 108. The UE 102 connects to the PDN 108 through a radio access network 104 and a core network 106 by establishing a PDN connection 110. The PDN connection 110 provides a path for data between the UE 102 and the PDN 108. The PDN 108 can belong to an MC organization, whereas the radio access network 104 and the core network 106 may belong to another entity, e.g., a mobile/cellular carrier or operator, Wi-Fi service/hot spot operator, etc. In some implementations, a communications system can include additional or different components, and features and can be configured in a different manner than the example system 100 shown in FIG. 1. For example, one UE is shown in FIG. 1 for clarity and brevity, but many UEs can be included in the system 100.

The UE 102 may be referred to as a mobile electronic device, user device, mobile station, subscriber station, portable electronic device, mobile communications device, wireless modem, wireless terminal, mobile equipment, session initiation protocol (SIP) user agent, set-top box, test equipment, terminal, station, or embedded modem. Examples of a UE may include a mobile phone, cellular phone, personal data assistant (PDA), smart phone, laptop, tablet, personal computer (PC), pager, portable computer, portable gaming device, wearable electronic device, or other mobile communications device having components for communicating data via a wireless communication network. The wireless communication network may include a wireless link over at least one of a licensed spectrum and an unlicensed spectrum.

Other examples of a UE 102 include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, IMS Subscriber Identity Module (ISIM) or a Removable User Identity Module (R-UIM) application. The term "UE" can also refer to any hardware or software component that can terminate a communication session for a user. In addition, the terms "user equipment", "UE", "user equipment device", "user agent", "UA", "user device", and "mobile device" can be used synonymously herein.

The radio access network 104 can be an evolved universal mobile telecommunications system (UMTS) terrestrial radio access network (E-UTRAN). The radio access network 104 comprise one or more radio access technologies. In some implementations, the radio access technologies may be a Global System for Mobile communication (GSM), Interim Standard 95 (IS-95), Universal Mobile Telecommunications System (UMTS), CDMA2000 (Code Division Multiple Access), Evolved UMTS terrestrial radio access (E-UTRA), Long Term Evolution (LTE), LTE-Advanced, or IEEE 802.11 WLAN. In many cases, a radio access network includes at least one base station. A base station may be a radio base station that may control all or at least some radio-related functions in a fixed part of the system. The base station may provide radio interface within their coverage area or a cell for a UE to communicate. The base station may be distributed throughout the cellular network to provide a wide area of coverage. The base station may directly communicate with one or a plurality of UEs 102, other base stations, and one or more network nodes in a core network 106.

The core network 106 can be an evolved packet core (EPC). The core network 106 may include Mobility Management Entity (MME), a Serving General Packet Radio Service (GPRS) Support Node (SGSN), Mobile Switching Center (MSC), Home Location Register (HLR), Home Subscriber Server (HSS), Authentication, Authorization, and Accounting (AAA) server, or other network nodes or entities. The core network 106 can provide services to users such as traffic routing, call control/switching, authentication, and accounting/charging.

The PDN 108 can be identified by an APN. An APN consists of an NI and an Operator Identity (OI). Both the NI and OI include a string of characters separated by dots (where the characters in between the dots are referred to as "labels"). In some implementation, the content of OI is defined and appended by the core network 106 (e.g. SGSN, MME, SGW, PGW, etc.) to the end of an NI and the content of NI may be determined by the UE 102.

In operation, to determine APN information of the PDN 108 for the UE 102 to receive MC services or perform MC user authentication, the following four solutions, as will be discussed below, can be used: (1) automatic derivation, (2) enhanced device management, (3) combination of automatic derivation and enhanced device management, and (4) enhanced MC user authentication.

Solution 1: automatic derivation.

In Solution 1, the UE derives the NI of an APN. For example, the APN NI is derived based on the MC organization name and one or more of the UE's RPLMN identifier (ID), HPLMN ID, and one or more other labels e.g., to denote the PDN is for MC Services or MC user authentication. In some cases, the UE may append the OI to the derived NI of the APN.

The UE may derive the APN NI for MC Service or MC user authentication by creating a string of characters that consists of a series of labels (where each label is separated by a full-stop or period), and where the values of the labels are based on one or more of the following parameters available to the UE:

RPLMN ID
HPLMN ID
MC Organization name, which is configured in the UE (e.g. as per Annex B.3 of 3GPP TS 23.179).
A further label or hostname or domain name (e.g. "mc-serv", "mc-user-auth") to denote the PDN is for MC Services or MC user authentication For example, if the following values are assumed:
RPLMN ID=54321;
HPLMN ID=12345; and
MC organization name=fireservice.gov.uk;

The following are some example APN NIs to use for one or both of MC Services and MC user authentication:
mc-serv.fireservice.gov.uk
mc-user-auth.fireservice.gov.uk
fireservice.gov.uk.mc-sery
fireservice.gov.uk.mc-user-auth
mnc021.mcc543.fireservice.gov.uk.mc
mnc021.mcc543.mc.fireservice.gov.uk.apn.epc.mnc045.mcc123.3gppnet work.org The inclusion or exclusion of the RPLMN ID, HPLMN ID, and any other label in the APN NI may be indicated by a configuration in or available to the UE, e.g., one or more parameters stored in a file on the SIM or USIM in the UICC, one or more parameters provided via configuration available to the UE (e.g. an Open Mobile Alliance (OMA) data management (DM) management object (MO)), etc. For example, the UE would include the RPLMN ID if the UE is configured to include the RPLMN ID.

In some implementations, as an alternative to the HPLMN ID derived from the International Mobile Subscriber Identity (IMSI) as stored in on the USIM, the UE may use a different PLMN ID e.g. $EF_{EHPLMN}$ file on the USIM as specified in subclause 4.2.84 in 3GPP TS 31.102, $EF_{HPLMNwAcT}$ file on the USIM as specified in 3GPP TS 31.102. When multiple PLMN IDs are available to the UE to use as the HPLMN ID (e.g. from $EF_{EHPLMN}$ or $EF_{HPLMNwAcT}$), the UE may apply a prioritization, e.g., use the first PLMN ID available (i.e. the first PLMN ID obtained from the UICC), use the last PLMN ID available, use the highest priority PLMN ID, or lowest priority PLMN ID as indicated in a priority field in the file, etc.

The UE may derive an APN for MC services or MC user authentication at any time. Once the UE has derived the APN NI, the UE can use the APN NI in existing LTE, GPRS or WLAN procedures, e.g., an E-UTRAN Initial Attach procedure (as defined in 3GPP TS 23.401), a dedicated PDN connection establishment (as defined in 3GPP TS 23.401, 3GPP TS 23.402, 3GPP TS 24.301 and 3GPP TS 24.302), a Packet Data Protocol (PDP) context activation (as defined in 3GPP TS 23.060 and 3GPP TS 24.008).

In some implementations, an MME or any other network entity can use the procedure of Solution 1 to derive an APN NI for MC Services or MC user authentication. The MME may derive the APN NI at any time. For example, the MME may derive the APN NI in order to establish a default PDN connection for the UE as part of the UE's E-UTRAN Initial Attach procedure.

Although Solution 1 is aimed at providing an automatically derived APN for one or both of receiving MC Services and performing MC user authentication, the same procedure may also be used to derive an APN for Business Critical (BC) services. BC services are associated with non-MC organizations, e.g., taxi firms, utility service companies, etc. Differences between deriving an APN for BC services and MC services may include, e.g., the use of a label of "bc-serv" instead of "mc-serv", or the use of a label of "bc-user-auth" instead of "mc-user-auth". Furthermore, Solution 1 may also be used to derive an APN for other services than just MC services and MC user authentication e.g. configuration management, where a label of, e.g., "configman" may be used instead of "mc-serv" or "mc-user-auth", etc.

Solution 2: enhanced device management.

In Solution 2, APN information (e.g., APN NI) for MC Services or MC user authentication can be stored in configuration data on a per MC organization (e.g., per MC organization name) and per PLMN basis. In some implementations, the configuration data may include the APN NI based on the MC organization name, HPLMN, VPLMN and the service for which the UE wishes to connect a PDN, e.g., MC Services, MC user authentication, or other services (e.g. configuration management). For example, the configuration data may include the APN information corresponding to MC organization name X and HPLMN ID Y as well as the APN information corresponding to MC organization name X and VPLMN ID Z. The UE may determine the UE's MC organization name, RPLMN ID, and HPLMN ID. The UE may compare the UE's MC organization name and one of the UE's RPLMN ID or HPLMN ID with the MC organization and PLMN in the configuration data. Once a match is found, the UE can retrieve the APN information from the configuration data. During the comparison, configuration data for VPLMN can take precedence over configuration data for HPLMN. VPLMN data portions that contain both a Network data portion and a Country data portion can take precedence over VPLMN data portions that contain only a Country data portion. HPLMN data portions that contain both a Network data portion and a Country data portion can take precedence over HPLMN data portions that contain only a Country data portion. In some implementations, the configuration data is provisioned in the ME (which may have been provided via OMA DM and/or a file on the UICC e.g. in the SIM/USIM, in the ISIM, etc.).

Two different UE architectures can be used for Solution 2: a client-based architecture and a UE-based architecture.

Figure 2:
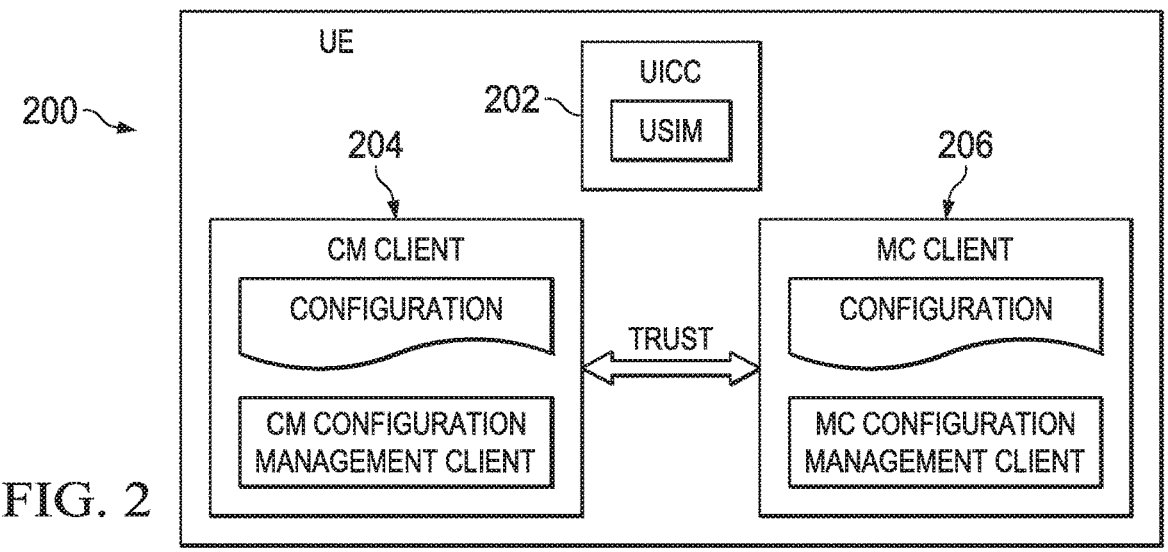
FIG. 2 illustrates an example client-based architecture for a user equipment (UE) according to an implementation.

FIG. 2 illustrates an example client-based architecture 200 for a UE according to an implementation. The UE architecture 200 includes a UICC 202, a configuration management (CM) client 204, and an MC client 206. The CM client 204 is within or associated to the MC client 206 running on the UE. The CM client 204 is inherently trusted by the MC client 206 and vice versa. In some cases, the MC client 206 can be implemented as an application. The CM client 204 and MC client 206 may be separated (logically and/or physically) from the UE entity and may communicate with the UE portion e.g. via a software interface, or via a short-range wired or wireless communications link.

Figure 3:
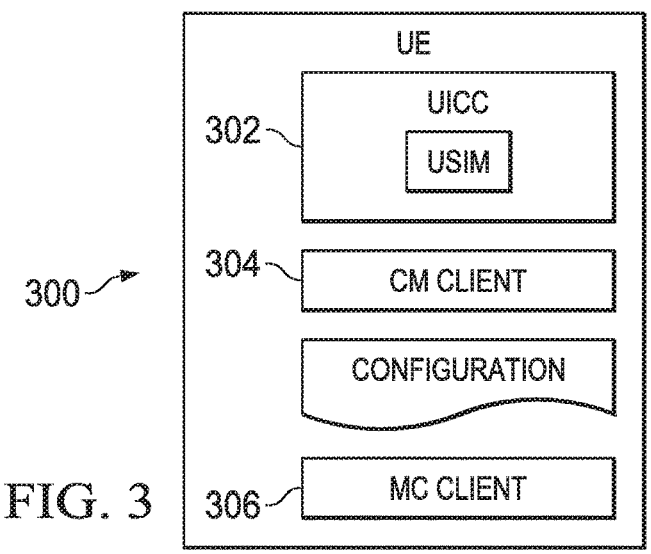
FIG. 3 illustrates an example UE-based architecture for a UE according to an implementation.

FIG. 3 illustrates an example UE-based architecture 300 for a UE according to an implementation. The UE architecture 300 includes a UICC 302, a configuration management (CM) client 304, and an MC client 306. The CM client 304 exists as part of the general UE functionality and is enhanced to obtain and store configuration details relevant to MC services. The MC client 306 may be discrete and separated (logically and/or physically) from the UE entity and may communicate with the UE portion e.g. via a software interface, or via a short-range wired or wireless communications link, etc.

Figure 4A:
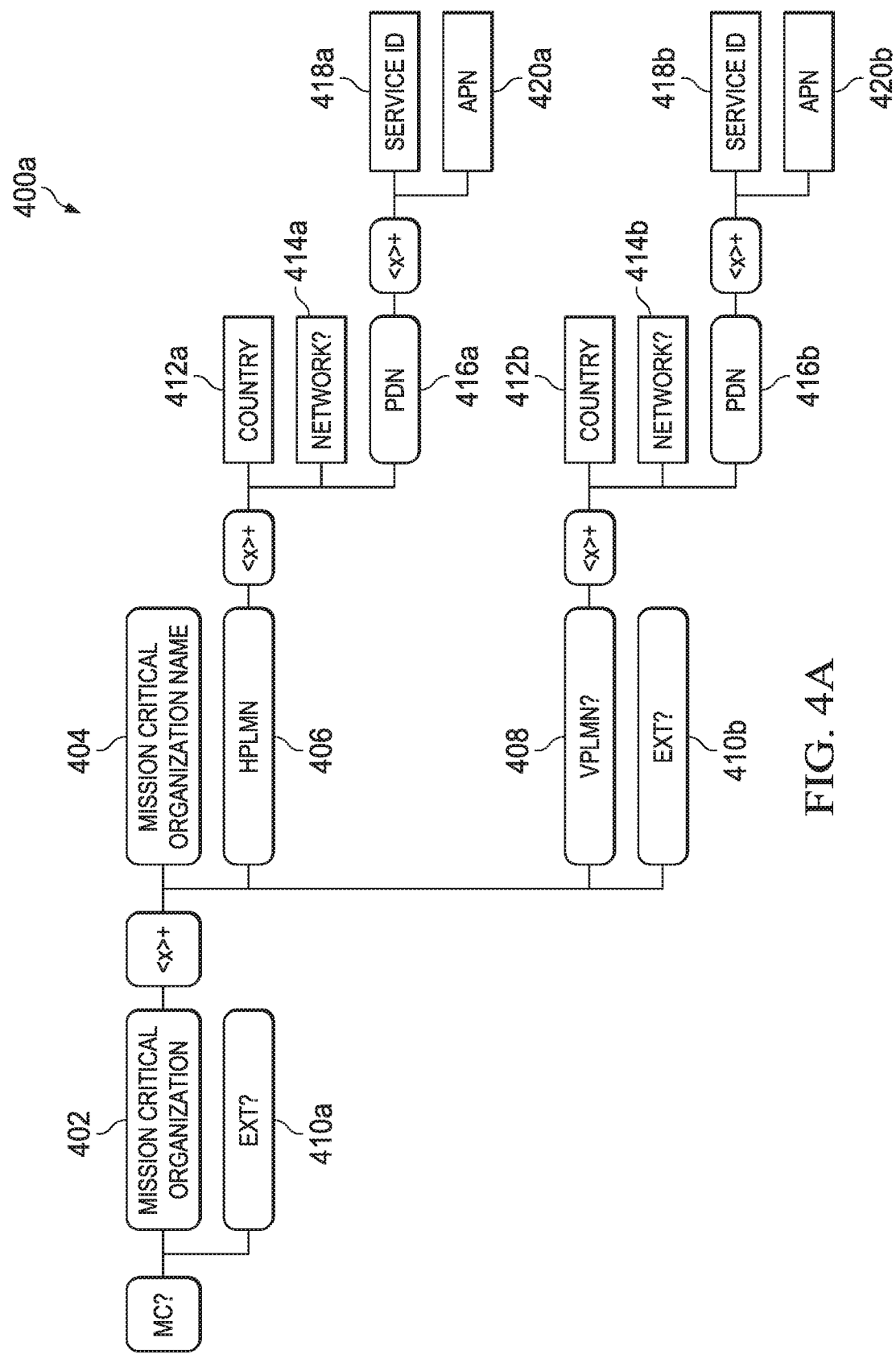
FIG. 4A illustrates an example management object structure for a client-based architecture according to an implementation.

FIG. 4A illustrates an example management object structure 400a for a client-based architecture, according to an implementation. The MO structure 400a can be used for MC Services, MC user authentication, or other services. The MO structure 400a includes:

one or more MC organizations 402, each of which may consist of one MC organization name 404 (or some other identifier e.g. domain name);
one or more data sets for HPLMN 406;
zero or more data sets for VPLMN 408; and
zero or one Extension portion 410a and 410b.

Figure 4B:
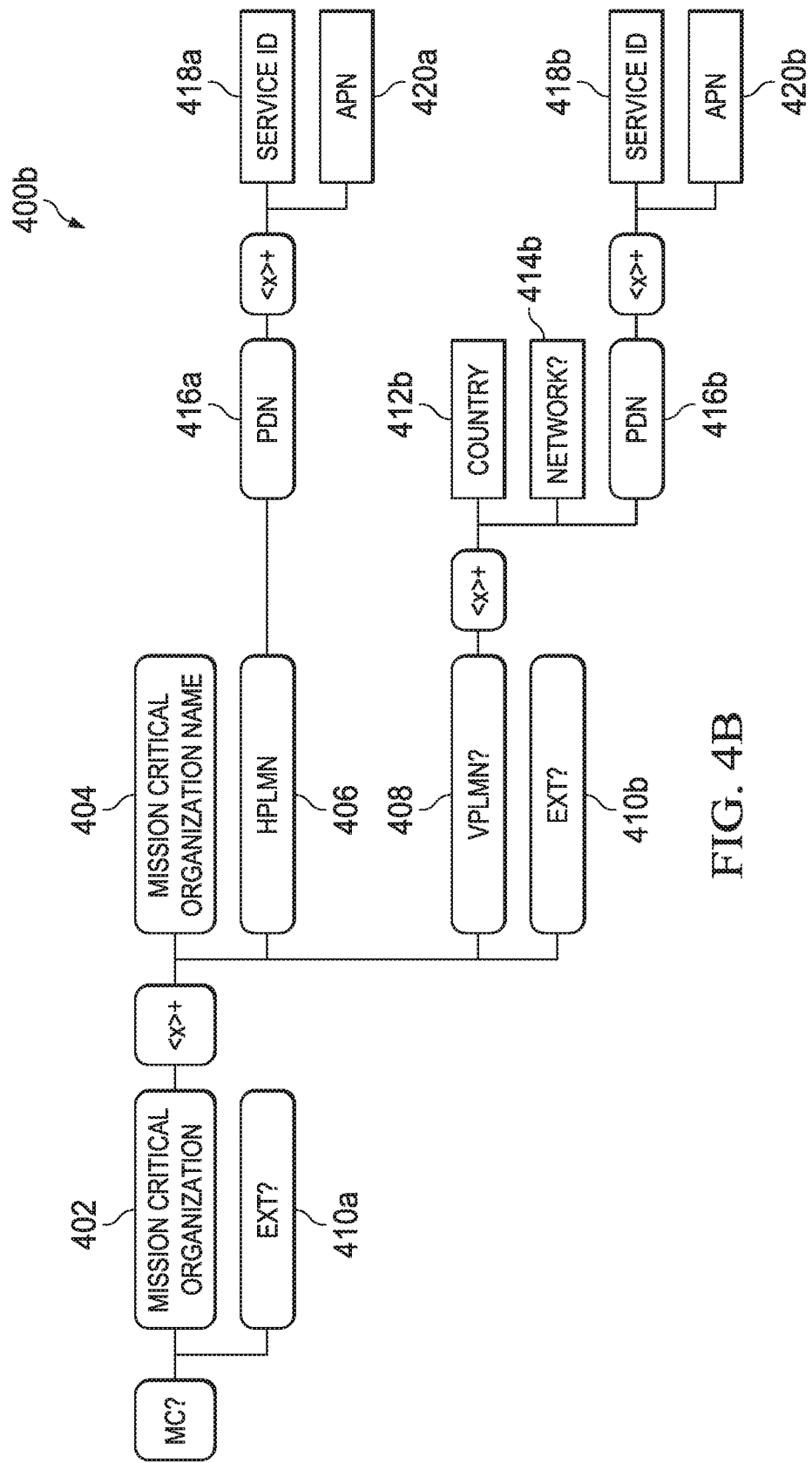
FIG. 4B illustrates an example management object structure for a UE-based architecture according to an implementation.

FIG. 4B illustrates an example management object structure 400b for a UE-based architecture, according to an implementation. The MO structure 400b can be used for MC Services, MC user authentication, or other services. The MO structure 400b includes:

one or more MC organizations 402, each of which consist of one MC organization name 404,
one data set for HPLMN 406;
zero or more data sets for VPLMN 408; and
zero or one Extension portion 410a and 410b.

Now referring to both FIGS. 4A and 4B. In MO structures 400a and 400b, the data sets for HPLMN 406 and VPLMN 408 can be same or different, and may comprise data portions of a Country 412a or 412b, a Network 414a or 414b, and one or more PDNs 416a or 416b. The Network data portion 414a or 414b is optional, and in its absence the one or more PDN data portions 414a or 416b would apply to any Network pertaining to the configured Country. VPLMN data portions may alternatively be placed under the HPLMN portion, in which case, VPLMN data portions would apply on a per HPLMN and per RPLMN basis rather than solely on a per RPLMN basis.

The Country data portion 412a or 412b and Network data portion 414a or 414b in either or both HPLMN and VPLMN can include parameters that identify a country and a mobile cellular network. Examples of such parameters may be Mobile Country Code (MCC) values and Mobile Network Code (MNC) values compliant with ITU-T E.212 or ITU-T E.164, unique string values (e.g. "UK" and "Vodafone" for the Vodafone network in the United Kingdom of Great Britain and Northern Ireland), etc. The Country data portion 412a or 412b may include values compliant with ISO 3166-1 or be represented by a plurality of data points e.g. GPS co-ordinates, longitude and latitude values, etc.

The data sets for PDN 416*a* or 416*b* in HPLMN and VPLMN can be the same or different, and may comprise data portions of a Service ID 418*a* or 418*b* and an APN 420*a* or 420*b* (e.g. APN NI, APN OI, both APN NI and APN OI). The Service ID portion 418*a* or 418*b* may include an identifier that has a defined mapping to a particular MC Service, BC Service, MC user authentication, configuration management, etc. The APN portion 420*a* or 420*b* may include an identifier that has a defined mapping to one or more specific values for the APN portion or may contain a string of characters (e.g. as defined in 3GPP TS 23.003) representing one or more APN NI values, APN OI values, or both APN NI and APN OI values. The APN data portion 420*a* or 420*b* for MC Services and MC user authentication may contain a string representing the APN (APN NI or both APN NI and APN OI) (e.g. using the format defined for APNs in 3GPP TS 23.003), or may include a reference, pointer, or indication to another set of data that provides appropriate settings/configuration for connecting to PDNs.

The data set for PDN 416*a* or 416*b* may include additional data portions, for example:
  APN (NI or both NI and OI) data for other services e.g. BC Services, User authentication for BC Services via the identity management framework of a particular BC Service Provider, Internet, Wireless Application Protocol (WAP), Multi-media Messaging Service (MMS), tethered data, etc.;
  additional information relating to PDN connections e.g. IP address, IP version, Quality of Service (QoS) settings such as QoS Class Identifier (QCI) and Maximum Bit Rate (MBR), etc.;
  indication of whether to include the APN NI or both APN NI and APN OI in certain procedures e.g. an E-UTRAN Initial Attach procedure (as defined in 3GPP TS 23.401), a dedicated PDN connection establishment (as defined in 3GPP TS 23.401, 3GPP TS 23.402, 3GPP TS 24.301 and 3GPP TS 24.302), a PDP context activation (as defined in 3GPP TS 23.060 and 3GPP TS 24.008);

In some implementations, some data portions may also optionally contain a "default" indication or additional data portions to those may be specifically defined to be a "default" data portions. A data portion indicated as default is a data portion that may be used when no other data portion is applicable, e.g., no VPLMN data portion and no HPLMN data portion applicable for the current RPLMN or current HPLMN exists, no PDN data portion applicable for the service for which the UE wishes to connect a PDN, etc.

Following is an example use of the MC MO defined in FIGS. 4A and 4B to choose an APN (e.g., APN NI) for a service (e.g. MC Services or MC user authentication, etc.):
  Step 1: Determine the MC organization name:
  In the client-based architecture, this may be obtained directly from the MC Client; or, this parameter may be configured already within the CM client.
  In the UE-based architecture, this may be provided by the MC client either in response to a specific request from the CM client, or as part of a request from the MC client.
  Step 2: Determine the HPLMN:
  For a CM client integrated/associated with the MC client (i.e. the client-based architecture), HPLMN can be determined by a request to the UE software/operating system and subsequent response. Alternatively, the MC client may request a notification from the UE of the HPLMN on initiation and/or at any subsequent change in HPLMN. In some cases, HPLMN can be determined by a request to the currently active SIM or USIM application on the UICC or embedded UICC (eUICC) to obtain the IMSI, and deriving the HPLMN from the IMSI's MCC and MNC.
  For a CM client running as part of the UE software discrete from the MC client (i.e. the UE-based architecture), HPLMN may be configured as part of the CM client. In some cases, HPLMN can be determined by a request to the currently active SIM or USIM application on the UICC or eUICC to obtain the IMSI, and deriving the HPLMN from the IMSI's MCC and MNC.
  Step 3: Determine the RPLMN:
  For the UE-based architecture, the RPLMN in most scenarios is known to the UE (available to a CM client running as part of the UE software), having been the PLMN identity returned in a successful 3GPP Attach procedure or registration update (e.g. tracking area update, routing area update, location update procedure).
  For a CM client integrated with the MC client (i.e., the client-based architecture), RPLMN can be determined by a request to the UE software/operating system and subsequent response. Alternatively, the MC client may request a notification from the UE of the RPLMN on initiation and/or at any subsequent change in RPLMN.
  Step 4: Determine the PDN data portion associated with the determined MC Organization, HPLMN and RPLMN. Details of this step will be discussed hereafter with regard to FIG. 5.
  Step 5: Using the retrieved APN (and any other relevant data) retrieved in step 4, perform (or request) one or more of the following:
    an E-UTRAN Initial Attach procedure (as defined in 3GPP TS 23.401);
    a dedicated PDN connection establishment (as defined in 3GPP TS 23.401, 3GPP TS 23.402, 3GPP TS 24.301 and 3GPP TS 24.302); and/or
    a PDP context activation (as defined in 3GPP TS 23.060 and 3GPP TS 24.008).

In some implementations, the steps 1-5 above may be carried out in order. For example, the determination of the HPLMN from the SIM or USIM may be completed in advance of (and independent of) a specific requirement related to MC services.

In some implementations, the steps 1-5 above, or part of the steps 1-5, may be initiated by one or more of the following events:
  In response to a determination that a PDN connection is to be established in order to fulfill a particular communications task (e.g. perform MC user authentication).
  In response to a request from the MC client e.g. via an application programming interface (API), to either (1) determine an APN or other parameter or (2) establish a PDN connection with an identified MC-related purpose.
  In response to a determination (or notification) that one or more of the following has changed: (1) the MC Organization, (2) the configuration data (e.g. the stored MO), (3) the HPLMN, and (4) the RPLMN.

Figure 5:
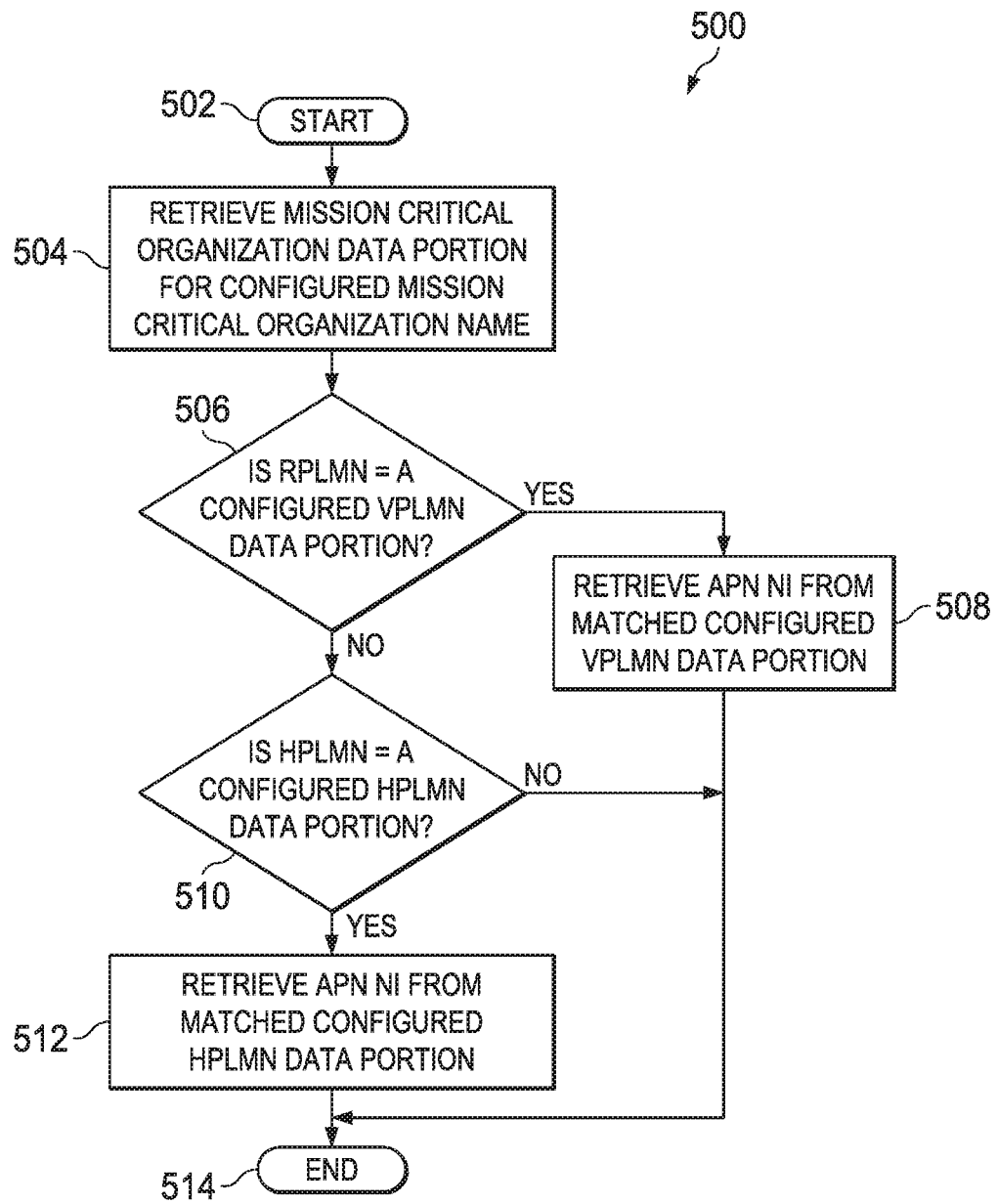
FIG. 5 is a flow chart illustrating an example method for obtaining packet data network (PDN) information contained in a PDN data portion based on determined mission critical (MC) organization, home public land mobile network, and registered public land mobile network, according to an implementation.

FIG. 5 is a flow chart illustrating an example method 500 for obtaining PDN information contained in a PDN data portion based on determined MC organization, HPLMN, and RPLMN, according to an implementation. The method 500 starts at block 502 and proceeds to block 504 where MC organization portion for configured MC organization name is retrieved. The method 500 proceeds to decision block 506. In some implementations, all data under all instances of the HPLMN data portion and all data under any VPLMN data portions (if one or more VPLMN instances exist) may be retrieved using the Mission Critical organization name. In these instances, the PDN data portion may be determined (e.g., retrieved, looked-up) using the HPLMN and any VPLMN data portions retrieved. If the RPLMN equals the configured VPLMN data portion, then, at block 508, the APN NI from the matched configured VPLMN data portion is retrieved. In other words, an attempt may be made to match a configured VPLMN data portion to the UE's current RPLMN for matching an input PLMN ID to a configured PLMN data portion. For example, if a matched configured VPLMN data portion is found then the PDN data portion from the matched configured VPLMN data portion is retrieved and the APN NI is retrieved using the matched configured VPLMN data portion. Otherwise, the method 500 proceeds to decision block 510.

At block 510 it is determined if the HPLMN equals the configured HPLMN data portion. For example, if no match to a configured VPLMN data portion is found, then a match to a configured HPLMN data portion to the UE's HPLMN is made for matching an input PLMN ID to a configured PLMN data portion. If a match occurs at decision block 510, the APN NI from the matched configured HPLMN data portion is retrieved at block 512. For example, if a match to a configured HPLMN data portion is found, then the PDN data portion is retrieved from the matched configured HPLMN data portion and the APN NI is retrieved using the matched configured VPLMN data portion. In these instances, if no match to a configured HPLMN data portion is found, then the procedure ends at block 514 or a remedial action is taken. The remedial action will be discussed below.

As previously mentioned, if a match is found in decision blocks 506 or 510, the APN NI is retrieved using the retrieved PDN data portion. In these instances, if a PDN data portion exists that contains a Service ID that indicates the service for which the UE wishes to use, then the associated APN (e.g. APN NI, APN OI, etc.) is retrieved and, optionally, any other data that is configured (e.g., MBR, QoS info, etc.) of that PDN data portion. The UE uses the retrieved APN to perform one of an E-UTRAN Initial Attach, a dedicated PDN connection establishment, or a PDP context activation. In some instances, a PDN data portion may not contain a Service ID that indicates the service for which the UE wishes to use. In these instances, if a PDN data portion exists that is indicated as a default PDN data portion, then the associated APN (e.g. APN NI, APN OI, etc.) is retrieved and, optionally, other data that is configured (e.g. MBR, QoS info, etc.) of that PDN data portion. The UE uses the retrieved APN to perform one of an E-UTRAN Initial Attach, a dedicated PDN connection establishment, or a PDP context activation. If a PDN data portion does not indicate a default PDN data portion, then the procedure ends and optionally a remedial action may be taken. In some implementations, the UE may store/cache for a period of time (e.g., defined by a timer, until the UE is powered off, until a new UICC is detected, until a new set of data is provisioned, etc.) all or a subset of the data portions retrieved in the method 500, thereby eliminating some steps in subsequent executions of the method 500.

The method 500 is one example for matching an input PLMN ID (e.g. RPLMN ID, HPLMN ID) to a configured HPLMN data portion or VPLMN data portion. For example, if the Country and Network data portions of the input PLMN ID match a configured PLMN data portion that has both Country and Network portions configured, then that configured PLMN data portion may be used as the matched configured PLMN data portion. In these instances, if a match does not occur with a configured PLMN data portion, then, if the Country data portion only of the input PLMN ID matches a configured PLMN data portion that has only a Country portion configured, that configured PLMN data portion may be used as the matched configured PLMN data portion. If neither of these previous two matches occur, a configured PLMN data portion that is indicated to be a "default" PLMN data portion may be used as the matched configured PLMN data portion. If a default is not identified, no matching configured PLMN data portion may be found.

In some implementations, one or a combination of the following remedial actions may be taken by the UE or a network node if there is a failure in the procedures in FIG. 5, e.g., if no PLMN data portion or PDN data portion may be retrieved:

1. Attempt to download an updated set of configuration data from the network e.g. by invoking the configuration management client to connect to the configuration management server.
2. Attempt to obtain/download a new set of configuration data e.g. using an OMA DM framework, from a file on a UICC, etc.
3. Attempt to use PDN data (e.g. APN NI) configured in the UE for another service, e.g., Internet, WAP, MMS, IMS (e.g. attempt to use the IMS well-known APN), etc.
4. Prompt the user to input a required APN (e.g., ANP NI) and optionally store it for future use, e.g., in all cases, for the current RPLMN, for the current HPLMN, for the current MC Organization, combinations thereof, etc.
5. Indicate to the user that the PDN for the particular service (e.g. MC Service, MC user authentication, etc.) cannot be connected to.
6. Indicate to the user that the APN for the particular service (e.g. MC Service, MC user authentication, etc.) is unknown to the UE.

In some implementations, an indication to the user by a UE for remedial actions 5 and 6 above may include one or more the following:
displaying a message on a screen associated with the UE;
flashing an LED;
causing an audible alert e.g. play a sound, play a tone; and
causing a physical alert e.g. a vibration.

In some implementations, other MO structures are possible that would allow the described methods to be carried out. For example, additional parent nodes may be included in the example MOs depicted in FIGS. 4A and 4B to organize the data portions differently (e.g. HPLMNs and/or VPLMNs on a per MC Service basis) and some existing parent nodes depicted in FIGS. 4A and 4B may be removed. In some implementations, APN (e.g., APN NI) information for MC Services or other services (e.g. APN information for MC user authentication) is made available to the UE in the configuration on the ME or UICC of the UE on a per MC Organization (e.g., per MC Organization name) and HPLMN basis and optionally also on the basis of one or more VPLMNs.

In some implementations, as an alternative to the example MOs in FIGS. 4A and 4B, the VPLMN data portion may appear as part of the HPLMN data portion, which would allow different VPLMN data portions on a per HPLMN basis.

Although Solution 2 is aimed at providing a configured APN for one or both of MC Services and MC user authentication, the same procedure may also be used to provide an APN for BC Services. Furthermore, the same procedure may also be used to provide an APN for configuration management and/or to determine that BC Services rather than MC Services are to be used.

Figures 6A, 6B:
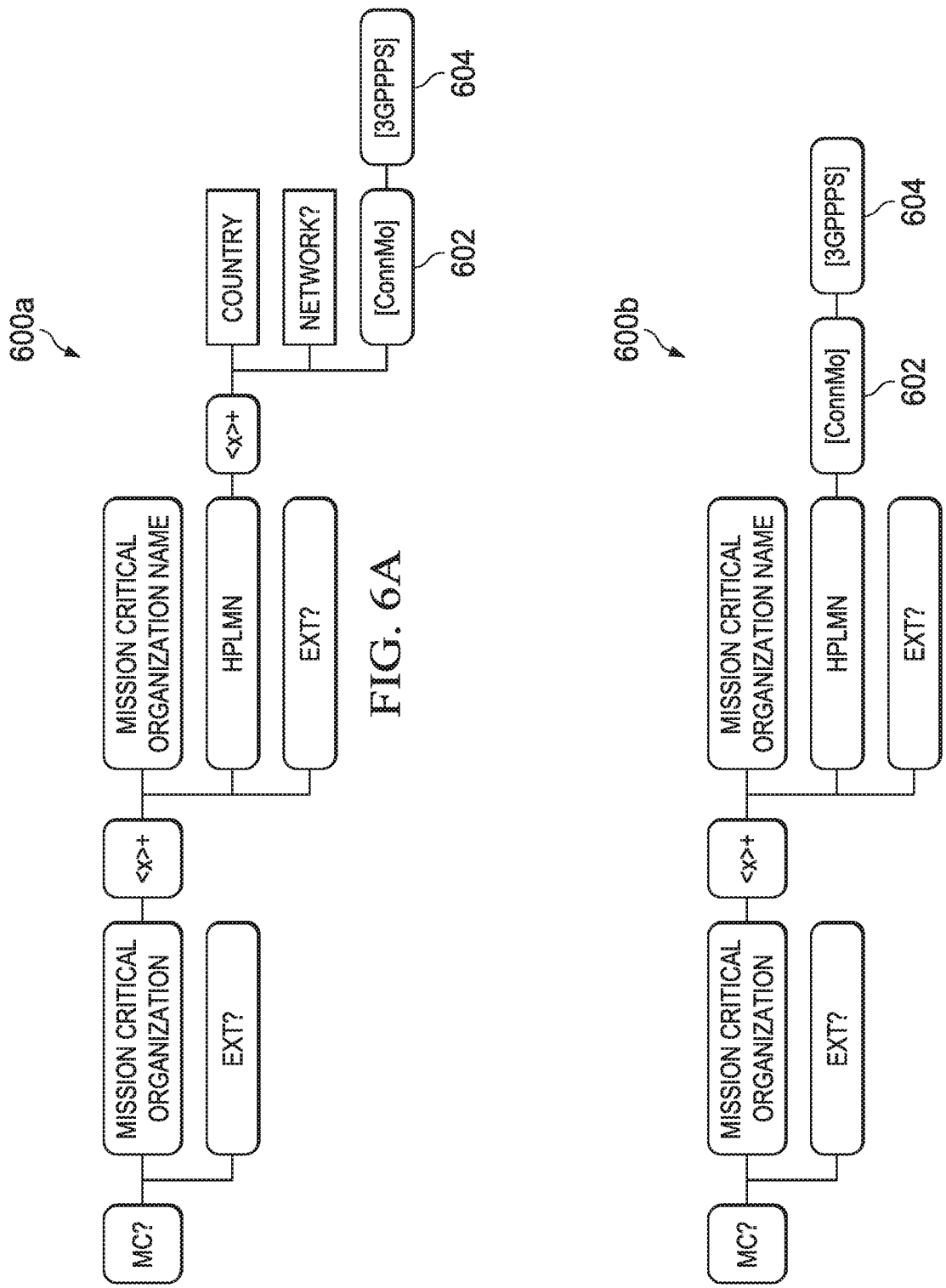
FIG. 6A illustrates an example management object structure reusing existing management object structures for a client-based architecture according to an implementation.
FIG. 6B illustrates an example management object structure reusing existing management object structures for a UE-based architecture according to an implementation.

FIG. 6A illustrates an example management object structure reusing existing management object structures for a client-based architecture, according to an implementation. FIG. 6B illustrates an example management object structure reusing existing management object structures for a UE-based architecture, according to an implementation. In some implementations, a UE may be configured with APNs (or any other data relating to PDN connections) using the OMA DM framework/enabler. An OMA client associated with the functionality of the UE within cellular networks currently can be configured by an OMA DM server controlled by its HPLMN with Packet Switched (PS)-related parameters via the enabler specified in OMA DDS DM_ConnMO_3GPPPS-V1_0-20081024-A (known as 3GPPPS MO), which relies on the Connectivity Management Objects Architecture (known as ConnMO), which in turn relies on the OMA DM framework/architecture. In the illustrated implementations, the VPLMN data portion and the PDN data portion may be absent and a ConnMO 602 and optionally also a 3GPPPS MO 604 be used instead, with the ConnMO 602 appearing in place of the PDN data portion as depicted in MO 600a and 600b. In this case, the UE would ignore any mandatory data portions of the 3GPPPS MO 604 that are configured but which are not applicable for the UE's currently used radio access technology (e.g. E-UTRAN). Note that the VPLMN data portion (as depicted in MO 600a and 600b) is not needed in this case because the Network Access Point (NAP) portion of the ConnMO 602 already contains an equivalent data portion (the "Validity" data portion).

As another alternative to the example MO structures 600a and 600b, the VPLMN data portion and the PDN data portion may be absent and a ConnMO and optionally also a 3GPPPS MO be used instead, with the ConnMO 602 appearing in place of the PDN data portion as depicted in MO 600a and 600b. In this case, the UE may ignore any mandatory data portions of the 3GPPPS MO 604 that are configured but which are not applicable for the UE's currently used radio access technology (e.g. E-UTRAN). Note that the VPLMN data portion (as depicted in MO 600a and 600b) may not be needed in this case because the NAP portion of the ConnMO may already contain an equivalent data portion (the "Validity" data portion).

Although this Solution 2 is aimed at providing a configured APN (and optionally other information) for one or both of MC Services and MC user authentication, the same procedure could also be used to provide an APN for BC Services. Furthermore, the same procedure could also be used to provide an APN for configuration management and/or to determine that BC Services rather than MC Services are to be used.

Solution 3: Combination of Automatic Derivation and enhanced Device Management.

Solution 3 can be a combination of Solution 1 and Solution 2. For example, the UE can first use Solution 1 to derive an APN NI, and if the derived APN NI does not work, the UE then use Solution 2, or alternatively Solution 2 may be performed followed by Solution 1 if Solution 2 does not work. In some cases, the UE derives an APN NI as per Solution 1 as a consequence of not having any configuration as per Solution 2. In some cases, the UE uses configurations available to the UE to determine an APN NI as per Solution 2 as a consequence of either of the following failures as per Solution 1:
 the failure to perform an E-UTRAN Initial Attach procedure using the derived APN NI from Solution 1; or
 the failure to establish a dedicated PDN Connection or PDP Context to a PDN using the derived APN NI from Solution 1.

In some implementations, the UE may use any provisioned data (e.g. provisioned as per Solution 2) available to the UE, and in the absence of any provisioned data, or due to a particular parameter in the provisioned data, the UE may then derive an APN NI using Solution 1.

In some cases, the UE may derive an APN NI using Solution 1 and then attempt to use the derived APN NI in one of the following standardized procedures:
 perform an E-UTRAN Initial Attach procedure (as defined in 3GPP TS 23.401);
 perform a dedicated PDN connection establishment (as defined in 3GPP TS 23.401, 3GPP TS 23.402, 3GPP TS 24.301 and 3GPP TS 24.302); and/or
 perform a PDP context activation (as defined in 3GPP TS 23.060 and 3GPP TS 24.008).

In response to receiving a message indicating a failure of the foregoing standardized procedures (e.g. one or more specific cause codes are received in response to a message for one of the above procedures), the UE may use an APN NI determined from provisioned data (e.g. provisioned as per Solution 2) available to the UE for reattempting the procedure(s) that failed.

Although Solution 3 is aimed at determining an APN for one or both of MC Services and MC user authentication, the same procedure may also be used to determine an APN for BC Services. Furthermore, the same procedure may also be used to derive an APN for configuration management and/or to determine that BC Services rather than MC Services are to be used.

Solution 4: Enhanced MC User Authentication.

In this solution, the UE receives the APN information during the MC user authentication procedure. For example, the UE receives one or more APN NIs to use for MC Services and optionally other services (e.g. configuration management) from an identity management server as part of the MC user authentication or from a configuration management server after receiving an indication during MC user authentication. It is assumed that the UE has already determined what APN to use to perform MC user authentication somehow, e.g., using Solutions 1-3, initial UE (pre)configuration, etc. In some implementations, the UE, via an identity management client that resides in the UE, receives the APN information from the network (e.g., from an identity management server) during the MC user authentication.

The identity management client at the UE may perform the following steps:
 Step 1A: Sends an authentication message to the identity management server containing either one or more MC User Identities e.g. as per 3GPP TS 23.179.
 Step 2A: Receives an authentication message from the identity management server containing a parameter indicating support for APN NI configuration for MC Services. The parameter may indicate either (1) the identity management client can request an APN NI for MC Services, or (2) the identity management client cannot request an APN NI for MC Services.
 Step 3A: Sends an authentication response message to the identity management server containing an indication that an APN NI for MC Services is requested, as well as optionally the UE's HPLMN ID and the UE's current RPLMN ID.

Step 4A: Receives an authentication message from the identity management server containing the APN NI to be used by the UE for MC Services (e.g. for SIP/IMS registration, etc.).

Correspondingly, the identity management server in the network may perform the following steps:

Step 1B: Receives a message from the identity management client with either one or more MC User identities e.g. as per 3GPP TS 23.179.

Step 2B: Sends a message to the identity management client containing a parameter indicating support for APN NI configuration for MC Services. The parameter may indicate either (1) the identity management client can request an APN NI for MC Services; or (2) the identity management client cannot request an APN NI for MC Services.

Step 3B: Receives an authentication message containing an indication that an APN NI for MC Services is requested, as well as optionally the UE's HPLMN ID and the UE's current RPLMN ID. Based on the MC User Identity provided in step 1 and optionally also the received HPLMN ID and RPLMN ID, the identity management server may contact a database or the configuration management server to determine the APN NI for MC Services to be used by the MC User (i.e. as identified by the MC User Identity).

Step 4B: Sends an authentication message to the identity management client containing the APN NI for MC Services to be used by the UE (e.g. for IMS/SIP registration, etc.).

In some implementations, upon receiving the indication from the identity management server that the UE can request an APN NI for MC Services, the UE may invoke a configuration management client to contact a configuration management server for the APN for MC Services. In these cases, steps 3A and 4A for the identity management client described previously would be replaced with the following steps to be performed by the configuration management client:

Step 3A: Sends a message to the configuration management server containing an indication that an APN NI for MC Services is requested.

Step 4A: Receives a message from the configuration management server containing the APN NI to be used by the UE for MC Services, e.g. for Session Initiation Protocol (SIP) or IP Multimedia Sub-system (IMS) registration, etc.

Correspondingly, steps 3B and 4B for the identity management server described previously would be replaced with the following steps to be performed by the configuration management server:

Step 3B: Receives a message from a configuration management client containing an indication that an APN NI for MC Services is requested.

Step 4B: Sends a message to the configuration management client containing the APN NI for MC Services to be used by the UE (e.g. for IMS/SIP registration, etc.).

In some implementations, additional information to the APN may be provided to the UE by the network (i.e. provided in step 2A, 2B, 4A or 4B) either upon request (i.e. requested in step 1A, 1B, 3A or 3B) or not on request, e.g.:

APN (NI or both NI and OD data for other services e.g. configuration management, BC Services, Internet, WAP, MMS, tethered data, etc.;

additional information relating to PDN connections e.g. IP address, IP version, QoS settings (e.g. QCI, MBR), etc.; and indication of whether to include the APN NI or both APN NI and APN OI in certain procedures e.g. an E-UTRAN Initial Attach procedure (as defined in 3GPP TS 23.401), a dedicated PDN connection establishment (as defined in 3GPP TS 23.401, 3GPP TS 23.402, 3GPP TS 24.301 and 3GPP TS 24.302), a PDP context activation (as defined in 3GPP TS 23.060 and 3GPP TS 24.008).

In some implementations, an MO (e.g. ConnMO, 3GPPPS MO, MC MO as described in Solution 2) may be provided to the UE by the network (e.g., provided in step 2A, 2B, 4A or 4B) either upon request (i.e. requested in step 1A, 1B, 3A or 3B) or not on request.

Figure 7:
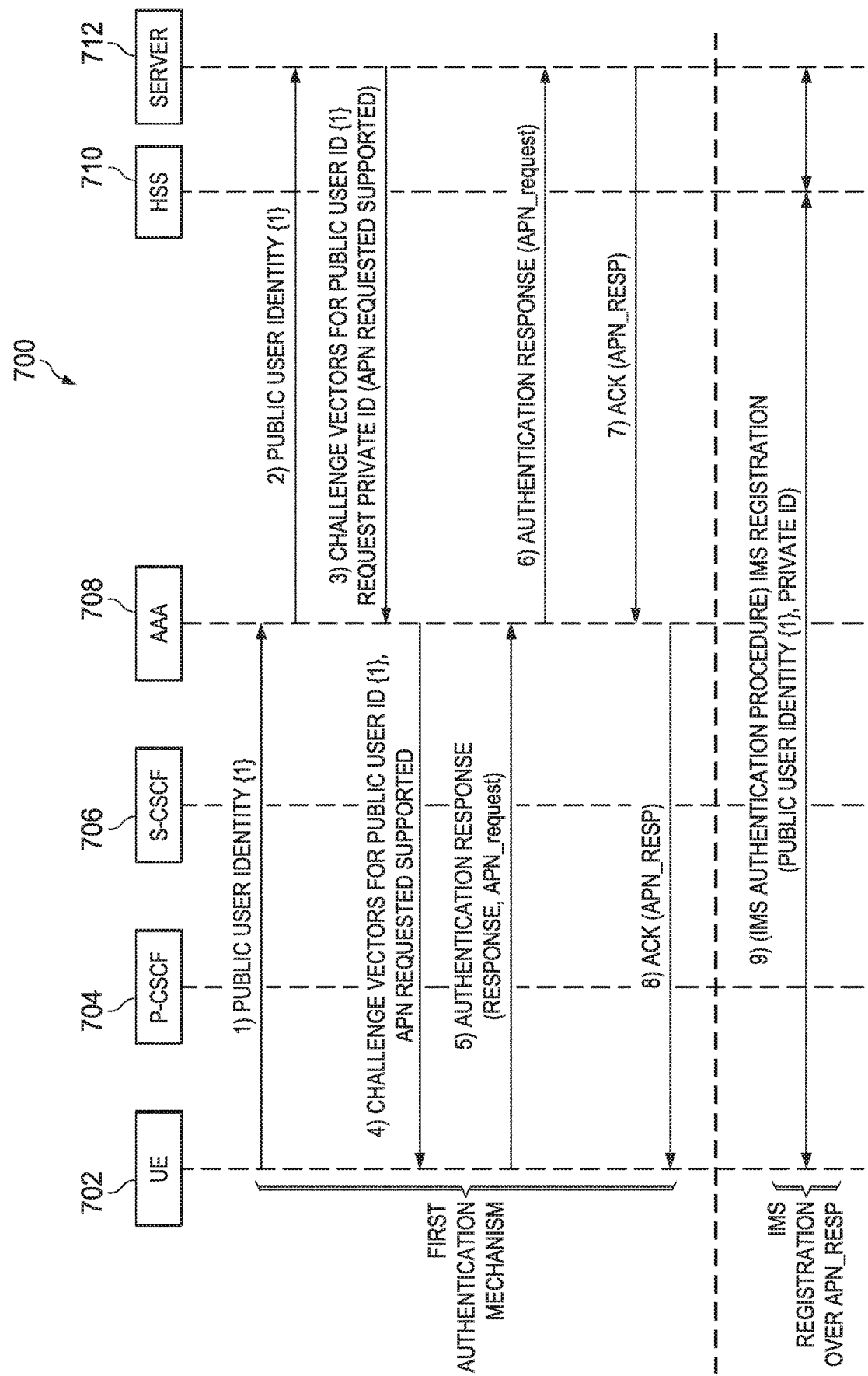
FIG. 7 is a data flow diagram illustrating an example process to obtain access point name (APN) information for MC services during an MC user authentication procedure according to an implementation.

FIG. 7 is a data flow diagram illustrating an example process 700 to obtain APN information for MC services during an MC user authentication procedure according to an implementation. The data flow diagram includes a UE 702, Proxy Call Session Control Function (P-CSCF) 704, Serving Call Session Control Function (S-CSCF) 706, AAA 708 (e.g. AAA server, AAA proxy, etc.) which can support APN configuration, HSS 710, and server 712.

At operation 1, the UE 702 sends a public user identity to the AAA 708. At operation 2, the AAA 708 sends the public user identity to the server 712.

At operation 3, the server 712 sends an authentication challenge message to the AAA 708 including an APN_REQUEST_SUPPORTED attribute to indicate that the UE can request APN information. At operation 4, the AAA 708 sends the authentication challenge message to the UE 702 including the APN_REQUEST_SUPPORTED attribute to indicate that the UE can request APN information.

At operation 5, the UE 702 sends an authentication response message including an APN_REQUEST attribute to indicate that the UE requests APN information. At operation 6, the AAA 708 sends the authentication response message including the APN_REQUEST attribute to indicate that the UE requests APN information. In some cases, the AAA 708 may contact an external database (e.g. an identity management server, a configuration management server) to obtain an APN to be used for the user identity provided at operation 1. The user identity provided at operation 1 may be sent to the external database.

At operation 7, the server 712 sends an acknowledge notification message to the AAA 708 including an APN RESP attribute to indicate the APN the UE can use. At operation 8, the AAA 708 sends the acknowledge notification message to the UE 702 including the APN RESP attribute to indicate the APN the UE can use.

At operation 9, upon receiving the acknowledgement notification message, the UE 702 can use the received APN for MC services, e.g., attempt to use the derived APN NI in one of the following standardized procedures:

perform an E-UTRAN Initial Attach procedure (as defined in 3GPP TS 23.401);

perform a dedicated PDN connection establishment (as defined in 3GPP TS 23.401, 3GPP TS 23.402, 3GPP TS 24.301 and 3GPP TS 24.302); and/or perform a PDP context activation (as defined in 3GPP TS 23.060 and 3GPP TS 24.008).

FIGS. 8A-8D illustrates an example description 800 to obtain APN information for MC services during an MC user authentication according to an implementation. The description 800 may be included in 3GPP TS 24.302.

Figure 9:
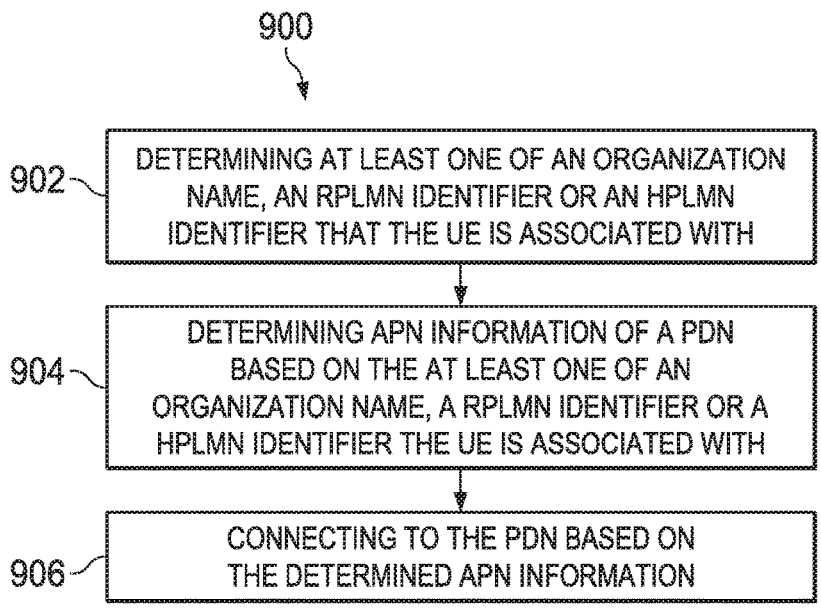
FIG. 9 a flow chart illustrating a first example method to determine an APN for MC services or for an MC user authentication service according to an implementation.

FIG. 9 is a flow chart illustrating a first example method 900 to determine APN for MC services or for an MC user authentication service, according to an implementation. The method 900 begins at block 902, where a UE determines at least one of an MC organization name, an RPLMN ID, or an HPLMN ID that the UE is associated with. At block 904, the UE determines APN information, e.g., APN NI, of a PDN based on the organization name, the RPLMN ID, or the HPLMN ID that the UE is associated with. The PDN can be used for at least one of MC services or MC user authentication. At block 906, the UE connects to the PDN based on the determined APN information.

Figure 10:
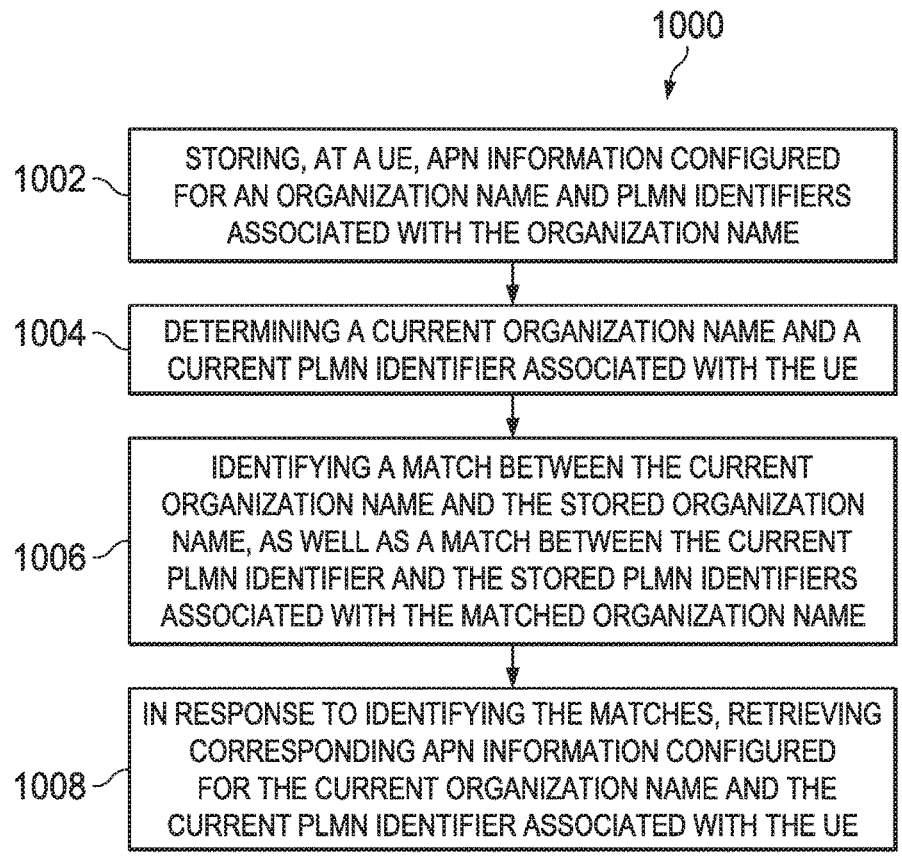
FIG. 10 is a flow chart illustrating a second example method to determine an APN for MC services or for an MC user authentication service according to an implementation.

FIG. 10 is a flow chart illustrating a second example method 1000 to determine APN for MC services or an MC user authentication, according to an implementation. The method 1000 begins at block 1002, where the UE stores APN information configured for an organization name and PLMN identifiers associated with the organization name. The configured APN information can be stored in an MO. The APN information can include an APN NI of a PDN, and the PDN is used for at least one of MC services or MC user authentication. The UE may include an MC client. At block 1004, the UE determines a current organization name and a current PLMN identifier associated with the UE. At block 1006, the UE identifies a match between the current organization name and the stored organization name, as well as a match between the current PLMN identifier and the stored PLMN identifiers associated with the matched organization name. At block 1008, in response to identifying the matches, the UE retrieves corresponding APN information configured for the current organization name and the current PLMN identifier associated with the UE. In some cases, the UE compares a current RPLMN identifier associated with the UE to a VPLMN identifier associated with the stored APN information. In response to no match from the comparing, the UE further compares a current HPLMN identifier associated with the UE to an HPLMN identifier associated with the stored APN information.

Figure 11:
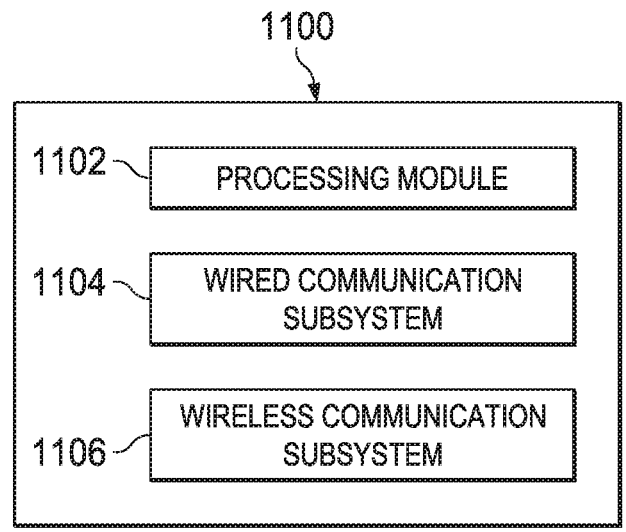
FIG. 11 is a schematic illustrating an example network node according to an implementation.

FIG. 11 is a schematic illustrating an example network node 1100, according to an implementation. The example network node 1100 includes a processing module 1102, a wired communication subsystem 1104, and a wireless communication subsystem 1106. The processing module 1102 can include one or more processing components (alternatively referred to as "processors" or "central processing units" (CPUs)) operable to execute instructions associated with managing inter-device communications. The processing module 1102 can also include other auxiliary components, such as random access memory (RAM), read-only memory (ROM), secondary storage (for example, a hard disk drive or flash memory). The processing module 1102 can execute certain instructions and commands to provide wireless or wired communication, using the wired communication subsystem 1104 or a wireless communication subsystem 1106. A skilled artisan will readily appreciate that various other components can also be included in the example network node 1100.

Figure 12:
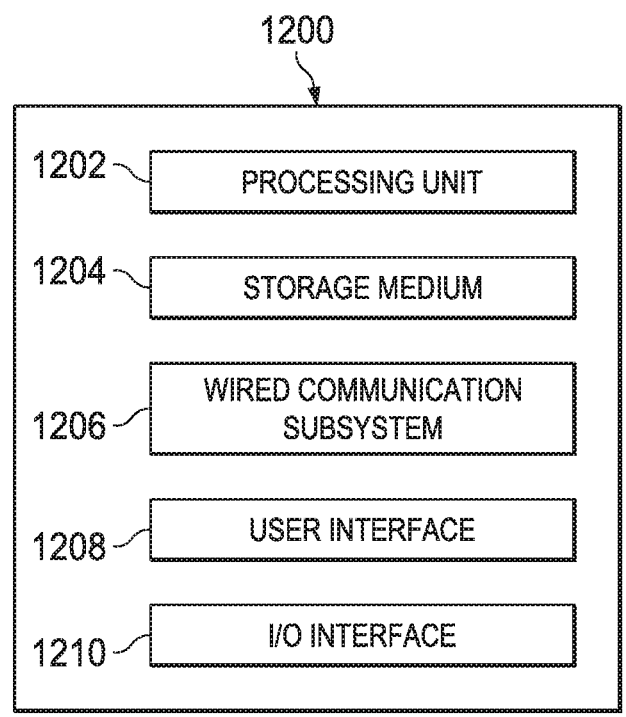
FIG. 12 is a schematic illustrating an example user equipment device according to an implementation.

FIG. 12 is a schematic illustrating an example UE apparatus, according to an implementation. The example UE 1200 includes a processing unit 1202, a computer-readable storage medium 1204 (for example, ROM or flash memory), a wireless communication subsystem 1206, an interface 1208, and an I/O interface 1210. The wireless communication subsystem 1206 may be configured to provide wireless communications for data information or control information provided by the processing unit 1202. The wireless communication subsystem 1206 can include, for example, one or more antennas, a receiver, a transmitter, a local oscillator, a mixer, and a digital signal processing (DSP) unit. The interface 1208 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 1210 can include, for example, a universal serial bus (USB) interface. A skilled artisan will readily appreciate that various other components can also be included in the example UE device 1200.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A user equipment (UE) comprising:
at least one hardware processor; and
a non-transitory computer-readable storage medium coupled to the at least one hardware processor and storing programming instructions for execution by the at least one hardware processor, wherein the programming instructions, when executed, cause the UE to perform operations comprising:
sending, by the UE to a first network node, a first message including at least one mission critical user identity associated with the UE;
receiving, from the first network node, a second message indicating that the UE can request access point name (APN) information of a packet data network (PDN) for mission critical services;
sending, by the UE to a second network node, a third message requesting the APN information; and
receiving, from the second network node, a fourth message including the APN information, wherein the first network node and the second network node are an identity management server, the first, second, third and fourth messages are sent or received via an identity management client in the UE, and the first, second, third and fourth messages are authentication messages.

2. The UE of claim 1, wherein the operations further comprise: connecting to the PDN based on the received APN information.

3. The UE of claim 1, wherein the APN information includes an APN network identity.

4. The UE of claim 1, wherein the UE includes a mission critical client and a configuration management client.

5. The UE of claim 1, wherein the PDN is used for at least one of a mission critical service or a mission critical user authentication.

6. A non-transitory computer-readable medium storing instructions which, when executed, cause a computing device to perform operations comprising:
  sending, by a user equipment (UE) to a first network node, a first message including at least one mission critical user identity associated with the UE;
  receiving, from the first network node, a second message indicating that the UE can request access point name (APN) information of a packet data network (PDN) for mission critical services;
  sending, by the UE to a second network node, a third message requesting the APN information; and
  receiving, from the second network node, a fourth message including the APN information, wherein the first network node and the second network node are an identity management server, the first, second, third and fourth messages are sent or received via an identity management client in the UE, and the first, second, third and fourth messages are authentication messages.

7. The non-transitory computer-readable medium of claim 6, wherein the operations further comprise: connecting to the PDN based on the received APN information.

8. The non-transitory computer-readable medium of claim 6, wherein the APN information includes an APN network identity.

9. The non-transitory computer-readable medium of claim 6, wherein the UE includes a mission critical client and a configuration management client.

10. The non-transitory computer-readable medium of claim 6, wherein the PDN is used for at least one of a mission critical service or a mission critical user authentication.

* * * * *